(12) United States Patent
Hirao

(10) Patent No.: US 6,478,473 B1
(45) Date of Patent: Nov. 12, 2002

(54) MULTIPLE-FIBER OPTICAL CONNECTOR, AND METHOD FOR ASSEMBLING THE SAME

(75) Inventor: Masahiro Hirao, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/583,894

(22) Filed: May 31, 2000

Related U.S. Application Data

(63) Continuation of application No. PCT/JP99/05428, filed on Oct. 1, 1999.

(30) Foreign Application Priority Data

Oct. 1, 1998 (JP) .......................................... 10-279905

(51) Int. Cl.[7] .............................................. G02B 6/38
(52) U.S. Cl. ............................ 385/59; 385/60; 385/66; 385/72
(58) Field of Search ............................. 385/59, 60, 64, 385/66, 72, 78, 48, 43

(56) References Cited

U.S. PATENT DOCUMENTS

| | | | | |
|---|---|---|---|---|
| 5,351,331 A | * | 9/1994 | Chun et al. | 385/97 |
| 6,062,740 A | * | 5/2000 | Ohtsuka et al. | 385/77 |
| 6,200,502 B1 | * | 3/2001 | Paatzsch et al. | 205/70 |
| 6,236,787 B1 | * | 5/2001 | Laughlin | 385/52 |
| 6,321,019 B1 | * | 11/2001 | Shibuya et al. | 385/115 |

FOREIGN PATENT DOCUMENTS

| | | |
|---|---|---|
| EP | 0 120 764 A1 | 3/1984 |
| FR | 2 334 969 A1 | 8/1977 |
| JP | 63-80510 | 5/1988 |
| JP | 64-45806 | 3/1989 |
| JP | 7-43555 | 2/1995 |

OTHER PUBLICATIONS

Satake et al.: "MT Multifiber Connectors and New Applications", US Conec Ltd., Jan. 5, 1994, pp. 994–999, Hickory, NC, USA.
International Search Report for PCT/JP99/05428 Nov. 25, 1999.
Cover page of PCT/JP99/05428 published as WO00/20908 on Apr. 13, 2000.

* cited by examiner

Primary Examiner—Tulsidas Patel
Assistant Examiner—Chandrika Prasad
(74) Attorney, Agent, or Firm—Lacasse & Associates, LLC

(57) ABSTRACT

In a prior art multiple-fiber optical connector, it was difficult to easily and securely insert and mount a plurality of optical fibers led out from the multiple-fiber optical fiber ribbon. Further, in such a prior art multiple-fiber optical connector, it was not possible to prevent a transmission loss from being generated due to local deformation of optical fibers, which is produced in mounting optical fibers, and a connection loss from being generated due to hardening and contraction of an adhesive agent, which are in the final assembling process. In order to solve such problems, a structure of an optical connector was designed as shown below; That is, a tapered portion (3) is provided in a fiber ribbon insertion hole (2) in order to narrow the width thereof, and the tip end (33) of a sheathed portion of a multiple-fiber optical fiber ribbon (31) is engaged in and stopped in the intermediate portion (8) of the tapered portion (3), whereby the insertion position is determined. In addition, in order to guide the led out optical fiber (32) continuously from the tapered portion (3), a conical introducing portion (4) having an adequate diameter is provided, and it becomes possible to collectively insert a plurality of optical fibers securely into appointed minute holes for inserting optical fibers. Furthermore, no insertion window for an adhesive agent is necessary.

13 Claims, 7 Drawing Sheets

MULTIPLE-FIBER OPTICAL CONNECTOR, AND METHOD FOR ASSEMBLING THE SAME

Figure 1A:
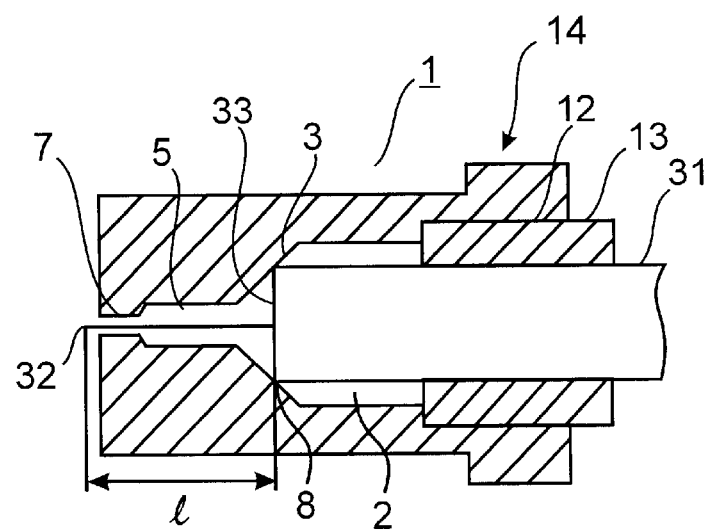

This application is a continuation of PCT/JP99/05428 filed Oct. 1, 1999, which further claims priority from Japanese Patent Application No: 10-279905 filed Oct. 1, 1998.

TECHNICAL FIELD OF THE INVENTION

The invention relates to a multiple-fiber optical connector, and method for assembling the multiple-fiber optical connector.

BACKGROUND OF THE INVENTION

Multiple-fiber optical fiber ribbons in which optical fibers juxtaposed in a plurality are collectively sheathed by a sheathing portion are used as optical transmissions. Further, a multiple-fiber optical connector has been used, in which the optical fibers are exposed by removing the sheathed portion at the tip end side of a multiple-fiber optical fiber ribbon, and the terminal end portion of the multiple-fiber optical fiber ribbon including the exposed optical fibers is inserted and fixed in a ferrule.

Where connecting optical fibers to each other by using an optical connector including such a multiple-fiber optical connector, accurate alignment among the respective optical fiber insertion holes is a requisite technology in order to minimize the connection loss. Further, high production efficiency assembling work with which the ratio of defective occurrence is minimized is also required for multiple-fiber optical connectors.

A prior art multiple-fiber optical connector has a ferrule 1 (multiple-fiber connector body) as shown in FIG. 6 and FIG. 7. A multiple-fiber optical fiber ribbon 31 and the respective optical fibers 32 are inserted and fixed in the ferrule 1. The ferrule 1 is provided with a boot insertion hole 12 into which the terminal end of the multiple-fiber optical fiber ribbon is inserted. Also, a V-shaped groove 21 which guides optical fibers is provided subsequent to said boot insertion hole 12. Further, a minute hole 7 for inserting an optical fiber, which has a slightly greater diameter than that of the optical fiber is provided subsequent to the V-shaped groove 21.

An adhesive agent inserting window 11 is formed on the upper surface of the ferrule 1, and the adhesive agent is used to cement the multiple-fiber optical fiber ribbon 31 and the respective optical fibers 32 to the ferrule 1. The adhesive agent inserting window also functions as a monitoring window for accurately inserting the respective optical fibers 32 into the minute holes 7 for inserting optical fibers.

The assembling process of the abovementioned prior art multiple-fiber optical connectors is as described below; First, after the sheath at the tip end side of a multiple-fiber optical fiber ribbon 31 is removed and the respective optical fibers are exposed (for taking out the heads thereof), a boot 34 is placed on the multiple-fiber optical fiber ribbon. And, the multiple-fiber optical fiber ribbon 31 is inserted into the boot insertion hole 12, and at the same time, the respective optical fibers are inserted into minute holes 7 for inserting optical fibers along the V-shaped groove 21. Next, an adhesive agent is supplied through the adhesive agent inserting window 11 and is filled up in the minute holes for inserting optical fibers while moving the multiple-fiber optical fiber ribbon forward and backward. And, the adhesive agent is thermally hardened, whereby the assembling is completed.

Figure 6A:
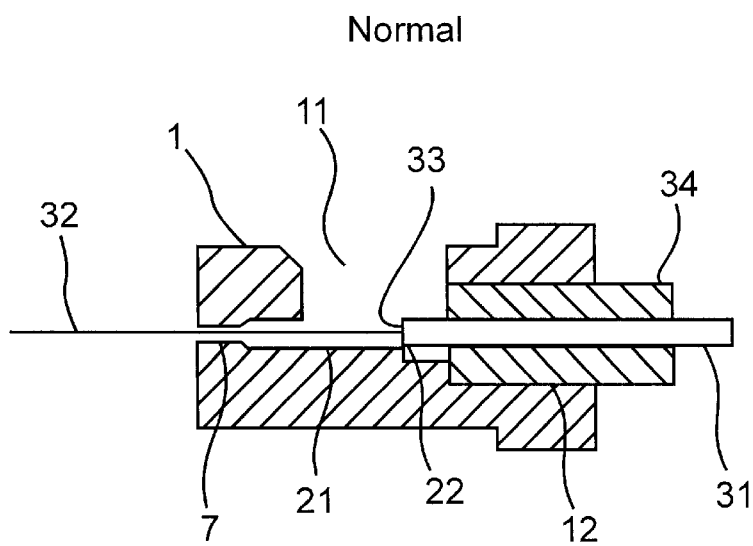

In the prior art multiple-fiber optical connector described above, the position for inserting the inserted multiple-fiber optical fiber ribbon 31 is determined, as shown in FIG. 6(a), at the position where the tip end portion (end face) 33 of the sheathed portion of the multiple-fiber optical fiber ribbon is brought into contact with a stepped portion 22 being the commencing position of the V-shaped groove 21. Further, FIG. 6(a) shows that the tip end portion 33 of the sheathed portion of a multiple-fiber optical fiber ribbon is accurately positioned at the stepped portion 22.

Figure 6B:
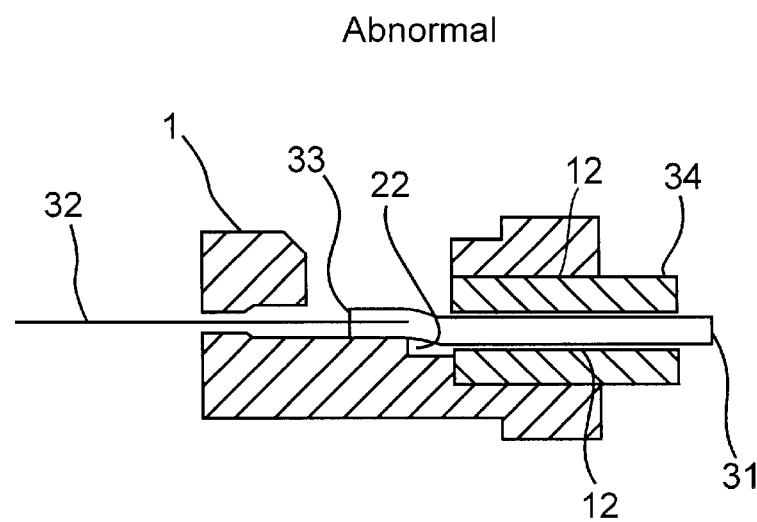

However, there are cases where, due to a slight unbalance in the working conditions, the tip end portion 33 of the optical fiber ribbon mounts the stepped portion 22 as shown in FIG. 6(b) and mounts the upper surface of the V-shaped groove 21. In these cases, an optical fiber is subjected to a local bending, and is seated and fixed by an adhesive agent with a bending stress given thereto. Therefore, a transmission loss is produced at the bent portion, and in the worst case an optical fiber is broken or cut off.

Figure 7A:
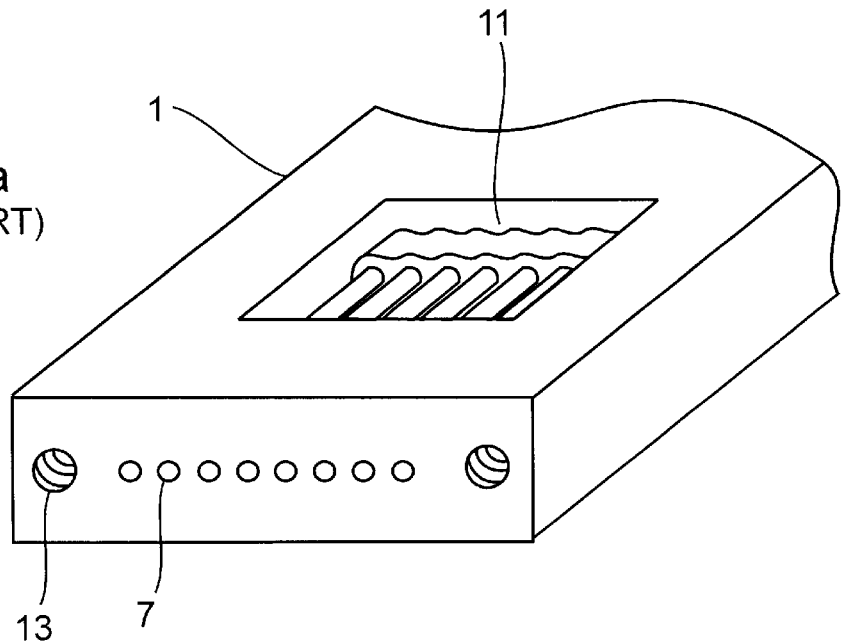

Also, as shown in FIG. 6 and FIG. 7(a), a ferrule 1 structured so that it has an adhesive agent inserting window 11 according to the prior art is asymmetrical in the vertical direction. Therefore, as the adhesive agent is hardened and contracted in an optical connector provided with the ferrule having the abovementioned structure, the surface weak in structure, where the adhesive agent inserting window 11 is provided, is deformed concave as shown in FIG. 7(b).

Figure 7B:
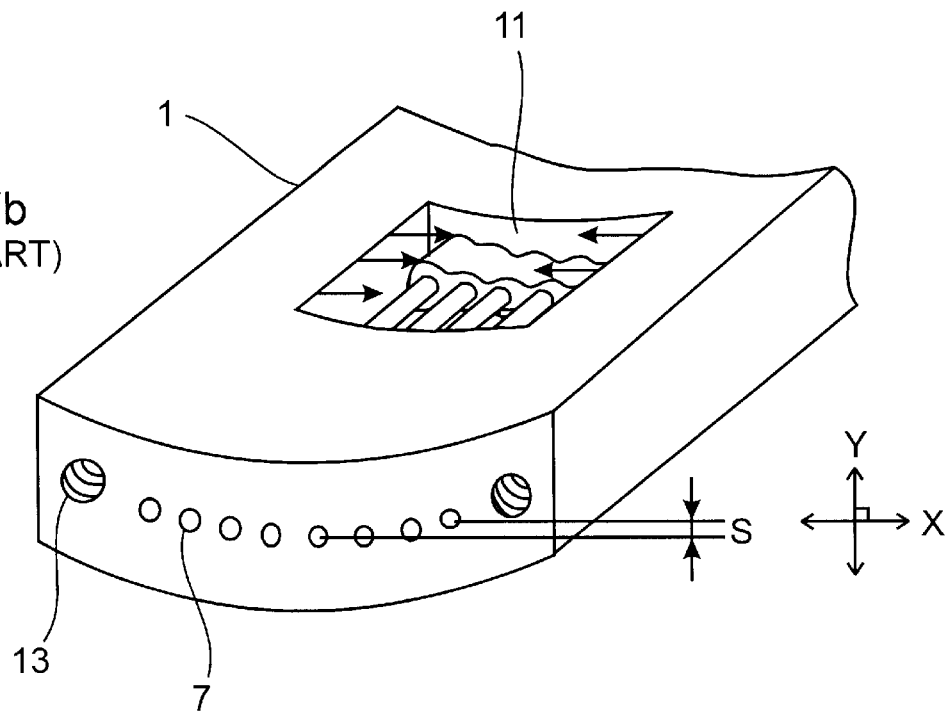

If such a deformation is produced, in the case of a multiple-fiber optical connector having a wide width, optical fibers whose array position is close to both sides and which are arrayed at the center portion greatly slip in the Y direction in FIG. 7(b) as shown at S is the same drawing. If so, the connection loss of the optical fibers using a multiple-fiber optical connector will be increased.

In addition, where it is assumed that the optical fiber array direction is the X direction, the abovementioned Y direction is orthogonal to the X direction and Z direction of the optical fiber axis. Also, a reference number 13 indicates an inserting hole for fitting pins used to connect an optical fiber to the mating optical connector.

As a countermeasure for deformation of the multiple-fiber optical connector, it is possible that a concave deformation amount of an optical connector resulting from the hardening and contraction amount of the adhesive agent is estimated in advance, and the position of the minute holes for inserting optical fibers is offset in design. However, since the amount of deformation is made uneven in line with an unbalance in the amount of inserting an adhesive agent, it was remarkably difficult to accurately assemble a highly accurate optical connector which can minimize the connection loss.

The invention solves the abovementioned shortcomings and problems, and it is therefore an object of the invention to provide a multiple-fiber optical connector which can facilitate automation of assembling work.

DISCLOSURE OF THE INVENTION

A multiple-fiber optical connector according to the first aspect of the invention is featured in that a multiple-fiber connector having a multiple-fiber optical fiber ribbon in which optical fibers juxtaposed in a plurality are collectively sheathed by a sheathing portion, and having the optical fibers exposed by removing the sheathed portion at the tip end side of the multiple-fiber optical fiber ribbon, in which the terminal portion of the multiple-fiber optical fiber ribbon including the exposed optical fibers are inserted and fixed in a ferrule; wherein the connector is provided with a ribbon insertion hole having a greater width than the width of the multiple-fiber optical fiber ribbon, a tapered portion communicating with the multiple-fiber optical ribbon, whose diameter is decreased toward the tip end side thereof, and minute holes for inserting optical fibers which communicate with the tapered portion and are juxtaposed in a plurality so that the respective exposed optical fibers are individually inserted thereinto, from one side to the other end side in the ferrule; the width at the tip end portion of the tapered portion is formed to be narrower than that of the multiple-fiber optical fiber ribbon; and the position in a width, in the course of the tapered portion, which is roughly coincident with the multiple-fiber optical fiber ribbon stops the tip end portion of the sheathed portion at the terminal portion of a multiple-fiber optical fiber ribbon inserted from the ribbon insertion hole, and is made into a stopping portion of the sheathed portion tip end which determines the tip end position.

A multiple-fiber optical connector according to the second aspect of the invention is featured in that, in addition to a multiple-fiber optical connector as set forth in the first aspect, an optical fiber introducing hole whose diameter is greater than that of minute holes for inserting optical fibers is formed at the forward side at the tip end side of the tapered portion, a conical inlet portion whose diameter is reduced is formed at the tip end side of the optical fiber introducing hole, and minute holes for inserting the optical fibers are formed so as to communicate with the conical inlet portion.

A multiple-fiber optical connector according to the third aspect of the invention is featured in that, in addition to a multiple-fiber optical connector as set forth in the first aspect or the second aspect, instead of forming a tapered portion whose tip portion width is narrower than the width of a multiple-fiber optical fiber ribbon, the connector is provided with a first tapered portion whose tip end width is roughly coincident with that of the multiple-fiber optical fiber ribbon, a tip end side insertion portion of a sheathed portion, which communicates with the first tapered portion, having a roughly fixed diameter, and whose hole width is roughly coincident with the multiple-fiber optical fiber ribbon, and a second tapered portion having a diameter-reduced tip end portion formed, via a stepped portion, at the tip end of the tip end side insertion portion of the sheathed portion; the inlet diameter of the second tapered portion is formed smaller than the width of the multiple-fiber optical fiber ribbon; the stepped portion of the tip end of the tip end side insertion portion of the sheathed portion stops the tip end portion of the sheathed portion at the terminal end portion of the multiple-fiber optical fiber ribbon, and is made into the sheathed tip end stopping portion which determines the position of the tip end portion.

A multiple-fiber optical connector according to the fourth aspect of the invention is featured in that, in addition to a multiple-fiber optical connector according to the third aspect, a conical introduction portion having a diameter-reduced portion at the tip end thereof is formed at the outlet of the tapered portion.

A multiple-fiber optical connector according to the fifth aspect of the invention is featured in that, in addition to a multiple-fiber optical connector according to the third aspect, a conical introduction portion having a diameter-reduced reduced portion at the tip end thereof is formed at the outlet of the second tapered portion.

A multiple-fiber optical connector according to the sixth aspect of the invention is featured in that, in addition to a multiple-fiber optical fiber according to the fourth aspect, the respective input end diameters of the conical introduction portion are formed so as to become $L>D>1\times\sin\theta$, where the optical fiber array pitch of a multiple-fiber optical fiber ribbon is L, the length of exposed optical fibers at the tip end of the multiple-fiber optical fiber ribbon is 1, the deflection angle of the exposed optical fibers is θ, and the respective inlet diameters of the conical introduction portion are D.

A multiple-fiber optical connector according to the seventh aspect of the invention is featured in that, in addition to a multiple-fiber optical connector according to the fifth aspect, the respective input end diameters of the conical introduction portion are formed so as to become $L>D>1\times\sin\theta$, where the optical fiber array pitch of a multiple-fiber optical fiber ribbon is L, the length of exposed optical fibers at the tip end of the multiple-fiber optical fiber ribbon is 1, the deflection angle of the exposed optical fibers is θ, and the respective inlet diameters of the conical introduction portion are D.

A multiple-fiber optical connector according to the eighth aspect of the invention is featured in that, in addition to a multiple-fiber optical connector according to the first aspect or the second aspect, no insertion window for an adhesive agent is provided.

A multiple-fiber optical connector according to the ninth aspect of the invention is featured in that, in addition to a multiple-fiber optical connector according to the third aspect, no insertion window for an adhesive agent is provided.

A multiple-fiber optical connector according to the tenth aspect of the invention is featured in that, in addition to a multiple-fiber optical connector according to the fourth aspect, no insertion window for an adhesive agent is provided.

A multiple-fiber optical connector according to the eleventh aspect of the invention is featured in that, in addition to a multiple-fiber optical connector according to the fifth aspect, no insertion window for an adhesive agent is provided.

A multiple-fiber optical connector according to the twelfth aspect of the invention is featured in that, in addition to the sixth aspect or the seventh aspect, no insertion window for an adhesive agent is provided.

A method for assembling a multiple-fiber optical connector according to the invention is an assembling method described in any one of either the eighth aspect through the twelfth aspect, wherein the terminal end portion of the multiple-fiber optical fiber ribbon including exposed optical fibers is fixed in a ferrule by hardening an adhesive agent after inserting the adhesive agent into the inlet side of a ribbon insertion hole of the ferrule, absorbing the adhesive agent through the outlet side at the tip end of the minute holes for inserting optical fibers, and inserting the exposed optical fibers into the minute holes for inserting optical fibers with the sheathing at the tip end of the multiple-fiber optical fiber ribbon removed.

A multiple-fiber optical connector according, to the first aspect or the second aspect of the invention is constructed so that a tapered portion which is diameter-reduced toward the tip end is provided at a ribbon inserting hole having a greater width than that of the multiple-fiber optical fiber ribbon, and the position, in the course of the tapered portion, of a width roughly coincident with the width of the multiple-fiber optical fiber ribbon stops the tip end portion of the sheathed portion of the terminal portion of the multiple-fiber optical fiber ribbon inserted from the ribbon inserting hole, and is made into a sheathed portion stopping portion which determines the tip end portion position.

Thus, in a multiple-fiber optical connector according to the first aspect or the second aspect of the invention, since the position of the tip end portion of the sheathed portion of the terminal end portion of the multiple-fiber optical connector is determined, there is no case where the tip end portion of the sheathed portion of the multiple-fiber optical connector mounts the stepped portion formed in the ferrule. Therefore, the multiple-fiber optical connector according to the first aspect or the second aspect of the invention can completely prevent mistakes in operation from occurring, such as a positional slip of the sheathed portion which will cause a transmission loss, an accident of interruption, etc.

Further, since a multiple-fiber optical connector according to the first aspect of the invention is simpler in structure, it becomes easier to produce the multiple-fiber optical connector itself. Also, in the multiple-fiber optical connector according to the second aspect, since minute holes for inserting optical fibers are formed via the optical fiber introducing holes and conical inlet portions having a reduced diameter at the tip end, it is possible to further easily carry out insertion of exposed optical fibers of the multiple-fiber optical fiber ribbon.

In a multiple-fiber optical connector according to the third aspect of the invention, there are provided the first tapered portion having a reduced diameter at the tip end, the tip end insertion portion at the sheathed portion, whose hole diameter is roughly coincident with the width of the multiple-fiber optical fiber ribbon and is roughly made fixed, and the second tapered portion having a reduced diameter at the tip end, which is formed at the tip end of the tip end insertion portion of the sheathed portion via the stepped portion, wherein the stepped portion at the tip end of the tip end insertion portion of the sheathed portion is made into a stopping portion of the tip end portion of the sheathed portion at the terminal end portion of the multiple-fiber optical fiber ribbon.

Therefore, the multiple-fiber optical fiber ribbon inserted into the ferrule can be positioned at an appointed position with respect to not only positioning in the insertion direction but also positioning in the vertical and horizontal directions without slipping from the center axis.

A multiple-fiber optical connector according to the fourth aspect or the fifth aspect of the invention is provided with a conical introducing portion formed at the outlets of the tapered portion and the second tapered portion, whereby it is possible to very easily perform insertion of exposed optical fibers.

In a multiple-fiber optical connector according to the sixth aspect or the seventh aspect of the invention, the inlet end diameter of the conical introducing portion can be set to an adequate value, and it is possible to further easily insert the exposed optical fibers. In addition, it is possible to collectively insert the exposed optical fibers in the respective corresponding optical fiber insertion holes. Still further, insertion of the terminal end portion of a multiple-fiber optical fiber ribbon including the exposed optical fibers into a ferrule can be securely automated.

In a multiple-fiber optical connector described in any one of either the eighth aspect through the twelfth aspect of the invention, since no adhesive agent inserting window is provided, it is possible to make the structure of an optical connector symmetrical in the vertical and horizontal directions. Therefore, even though the inserted adhesive agent is hardened and contracted, it is possible to prevent concave deformation from occurring, which was produced in prior art optical connectors having an adhesive agent inserting window, and it is possible to propose optical connectors which can minimize the connection loss after the assembling.

A method for assembling a multiple-fiber optical connector according to the invention enables insertion of an adhesive agent in a multiple-fiber optical connector not having any window for inserting an adhesive agent, and the insertion can also be automated. Therefore, it is possible to automate a series of assembling works of optical connectors from insertion of an adhesive agent, insertion of a multiple-fiber optical fiber ribbon, and fixing of the multiple-fiber optical connector in a ferrule by hardening of the adhesive agent.

BRIEF DESCRIPTIONS OF THE DRAWINGS

Figure 1B:
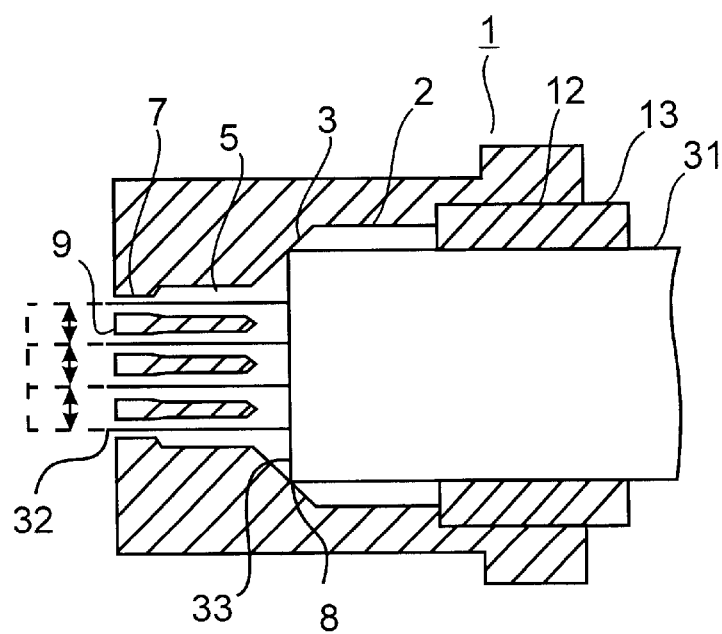
Figure 1C:
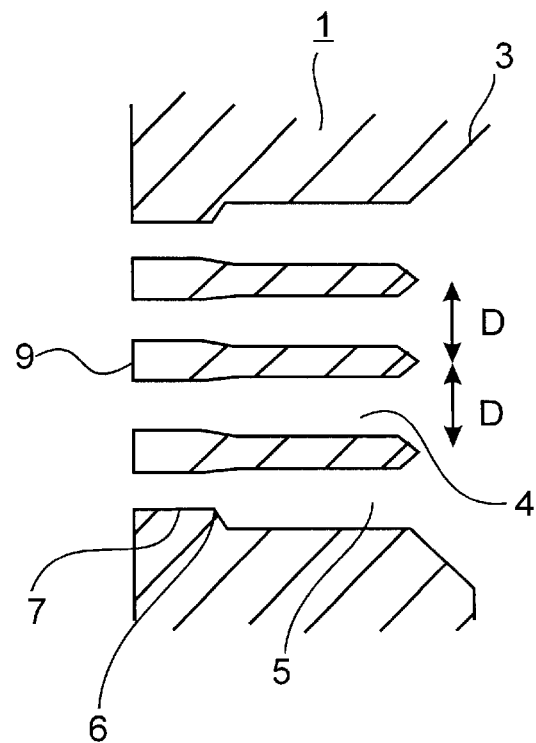
Figure 2:
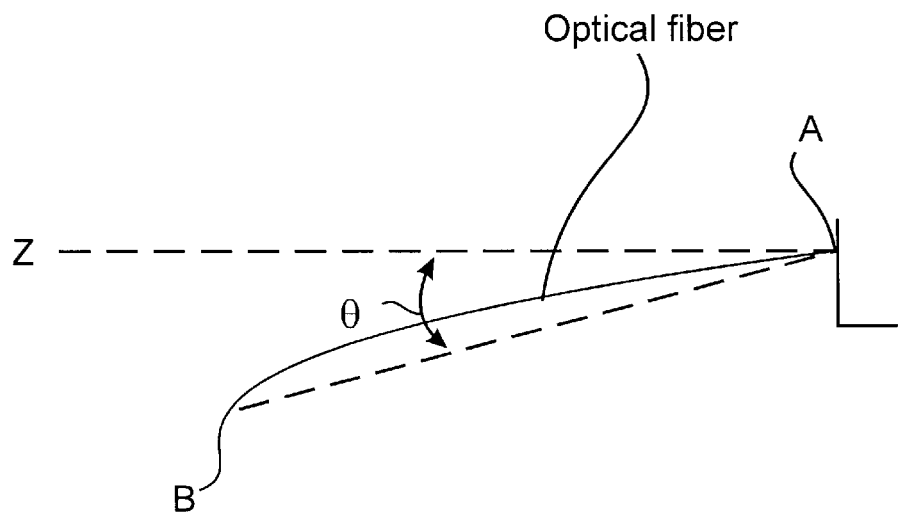
Figure 3A:
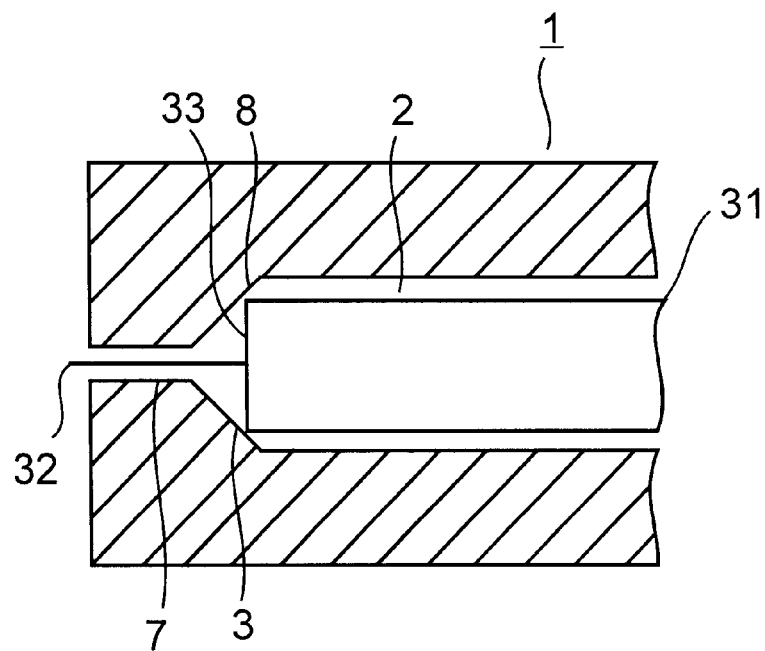
Figure 3B:
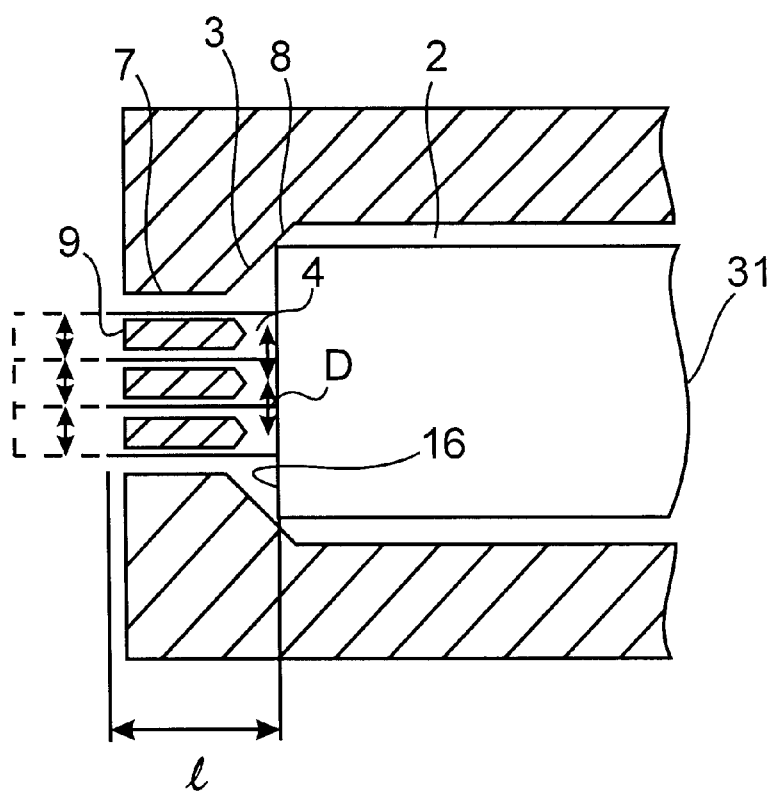
Figure 4A:
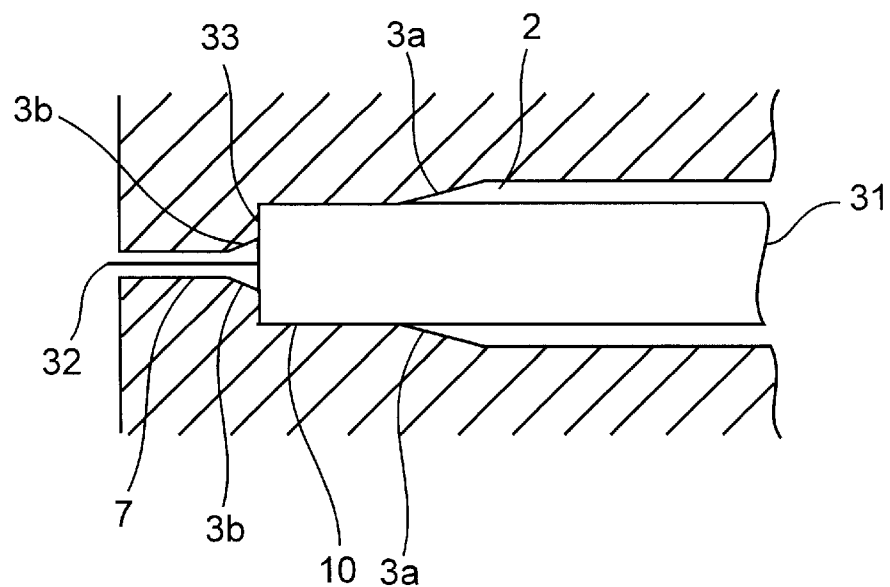
Figure 4B:
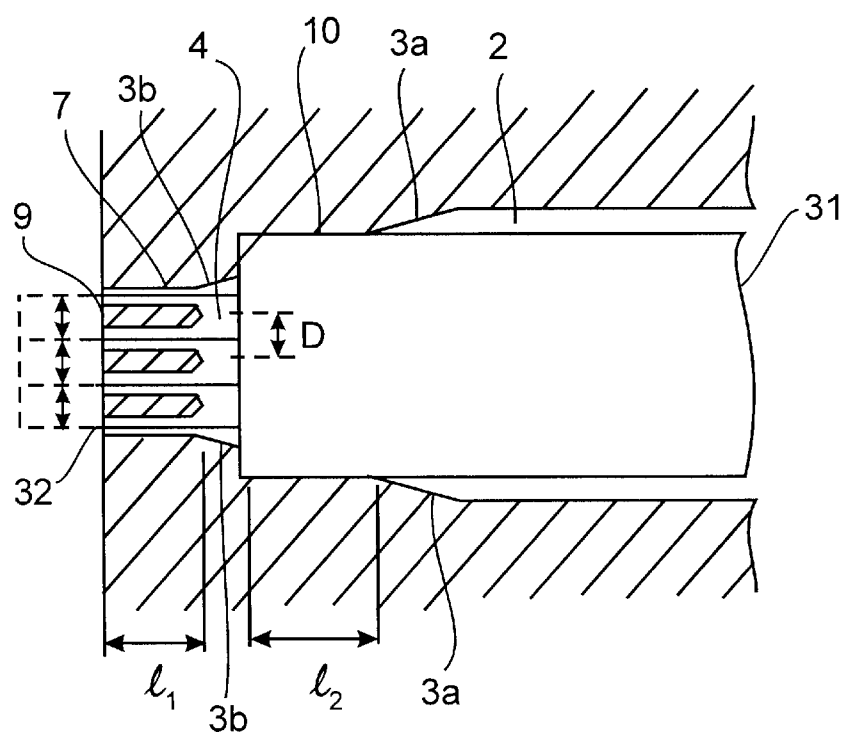
Figure 5:
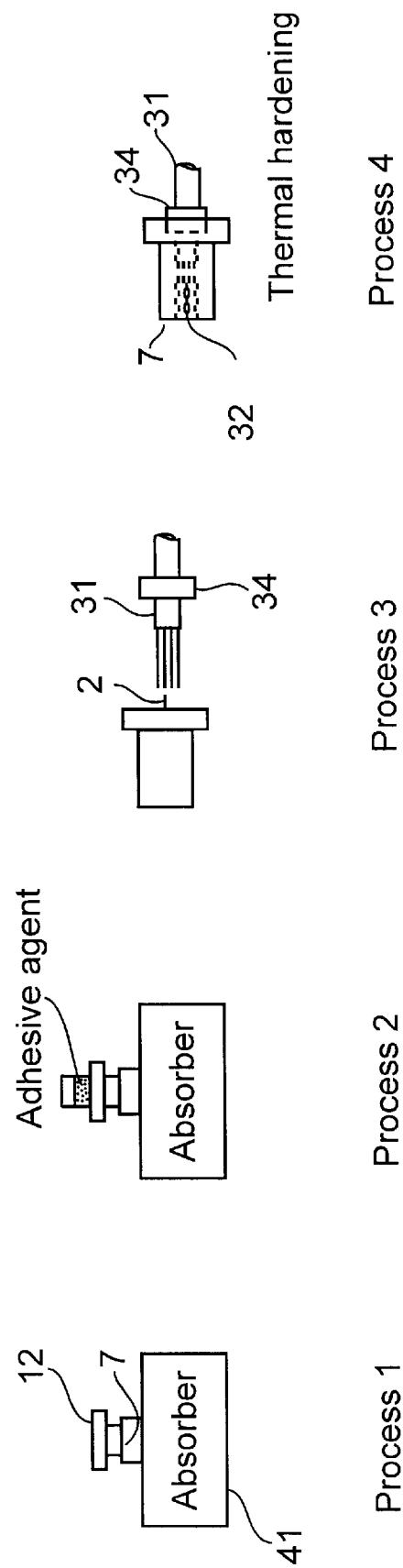

FIG. 1 is a sectional view of the construction of a multiple-fiber optical connector showing a first preferred embodiment of the invention, wherein (a) is a longitudinally sectional view thereof, (b) is a cross-sectional view thereof, and (c) is a partially enlarged view of (b), FIG. 2 is an explanatory view of a deflection angle θ of an optical fiber, FIG. 3 is a sectional view of the construction of a multiple-fiber optical connector showing a second preferred embodiment, wherein (a) is a longitudinally sectional view thereof, and (b) is a cross-sectional view thereof, FIG. 4 is a sectional view of the construction of a multiple-fiber optical connector showing a third preferred embodiment, wherein (a) is a longitudinally sectional view thereof and (b) is a cross-sectional view thereof, FIG. 5 is an explanatory view exemplarily showing a method for assembling a multiple-fiber optical connector according to the invention, using a process diagram, FIG. 6 is a longitudinally sectional view of a prior art multiple-fiber optical connector, wherein (a) is an explanatory view showing a state where a multiple-fiber optical fiber ribbon is adequately inserted into a ferrule, and (b) is an explanatory view showing a state where a multiple-fiber optical fiber ribbon is not adequately inserted into a ferrule, FIG. 7 is a perspective view of a prior art multiple-fiber optical connector, wherein (a) is an explanatory view of a multiple-fiber optical connector before an adhesive agent is hardened, and (b) is an explanatory view of a multiple-fiber optical connector which is deformed by hardening and contraction of the adhesive agent.

BEST MODE FOR CARRYING OUT THE INVENTION

To describe the invention in detail, a description is given of the preferred embodiments of the invention with reference to the accompanying drawings. In the description of the preferred embodiments, parts which are identical to those in the example shown as background art are given the same reference numbers, and any overlapping description thereof is omitted.

FIG. 1 shows a first preferred embodiment of a multiple-fiber optical connector according to the invention, wherein (a) is a longitudinally sectional view of a multiple-fiber optical connector, and (b) is a cross-sectional view (cross-sectional view) of the multiple-fiber optical connector. In these drawings, 14 is a multiple-fiber optical connector, and 31 is a multiple-fiber optical fiber ribbon.

The multiple-fiber optical connector 14 is such that the sheathed portion at the tip end side of the multiple-fiber optical fiber ribbon 31 is removed to expose an optical fiber 32, and the terminal end portion of the multiple-fiber optical fiber ribbon 31 including the exposed optical fiber 31 is inserted and fixed in a ferrule 1.

The ferrule 1 is provided, at one end thereof, with a ribbon insertion hole 2 having a greater width than that of the multiple-fiber optical fiber ribbon 31. A tapered portion 3 secured so as to communicate with the ribbon insertion hole 2 has a width reduced at the tip end side thereof. A plurality of conical introduction portions 4 having a reduced width at the tip end thereof are juxtaposed at the outlet of the tapered portion 3, and an optical fiber introducing hole 5 is formed at the front side of the ferrule. Also, FIG. 1(c) shows a state where the left side from the outlet side of the tapered portion 3 of the ferrule 1 is shown in enlargement in FIG. 1(b).

A conical inlet portion 6 having a reduced diameter is formed at the tip end side of the optical fiber introducing hole 5. Further, a minute hole 7 for inserting an optical fiber, into which each of the exposed optical fibers is individually inserted, is formed so as to communicate the conical inlet portion 6. The diameter of the minute hole 7 for inserting an optical fiber is formed slightly greater than the diameter of the exposed optical fiber 32. The diameter of the optical fiber introducing hole 5 is formed greater than the diameter of the minute hole for inserting an optical fiber. The optical fiber introducing hole 5, conical inlet portion 6, and minute hole 7 for inserting an optical fiber are juxtaposed in a plurality and formed so as to communicate with each other.

The width of the tip end portion of the tapered portion 3 is made narrower than that of the multiple-fiber optical fiber ribbon 31. The position 8, in the course of the tapered portion 3, of the width which is roughly coincident with the width of the multiple-fiber optical fiber ribbon 31 stops the tip end portion 33 of the sheathed portion of the terminal end portion of the multiple-fiber optical fiber ribbon 31 inserted through the ribbon insertion hole 2, and constitutes a stopping portion of the sheathed portion tip end which determines the position of the tip end portion. The most significant characteristic of the preferred embodiment is in that a sheathed portion tip stopping position is formed in the course of the tapered portion 3.

Further, in the preferred embodiment, the inlet end diameter D of the conical introducing portion 4 is established as shown below; That is, the D is determined as in L>D>1×sin θ, where the optical fiber array pitch of a multiple-fiber optical fiber ribbon 31 is L, the length of exposed optical fibers 32 at the tip end of the multiple-fiber optical fiber ribbon 31 is 1, the deflection angle of the exposed optical fibers 32 is θ.

If the diameter D of the inlet end of the conical introducing portion 4 is excessively great, the partitioning wall between the adjacent optical fibers 32 becomes too thin, whereby there is a fear that production of optical connectors becomes difficult. Further, if the diameter D of the inlet end of the conical introducing portion is excessively small, the tip end of the optical fibers 32 cannot be suitably guided, whereby there is a fear that the optical fibers 32 may be damaged.

Therefore, the present inventor carefully studied the relationship between the diameter D and easiness of insertion of optical fibers 32 with respect to the inlet end diameter D of the conical introducing portion 4. As a result, if the diameter D is established as described above, it is found that optical fibers 32 can be securely inserted into individual optical fiber introducing holes 5 without damaging the respective optical fibers.

Further, generally, since optical fibers are likely to be bent, there are many cases where the optical fibers are deflected or bent, as shown in FIG. 2, due to a bending tendency and self-weight, when a multiple-fiber optical fiber ribbon is horizontally placed. Therefore, in the specifications, an angle is determined by a line connecting the base end position A of an optical fiber to the tip end position B of the optical fiber, shown in the same drawing, and the optical axis Z of the optical fiber is defined as a deflection angle θ. In addition, in order to easily understand the description, FIG. 2 shows the amount of deflection in exaggeration.

Further, the deflection angle θ of optical fibers may differ in the respective optical fibers 32 juxtaposed in the multiple-fiber optical fiber ribbon 31. Therefore, an average value of the deflection angles θ of the respective fibers is employed in calculation of the inlet end diameter D of the conical introducing portion 4.

Also, the optical fiber deflection angle θ may be influenced by whether the optical fiber is of a single mode or a grated mode, physical properties such as hardness, etc., of material composition which constitutes the optical fiber, and thickness of the optical fibers, etc. Still further, the optical fiber deflection angle θ may be influenced by an exposure length of unsheathing of optical fibers when mounting in an optical connector, and in particular, is determined by ease in bending of the tip end portion of optical fibers. If the optical fibers are harder at the tip end thereof, that is, if the optical fibers have good linearity, the optical fiber deflection angle θ is decreased, wherein the inlet end diameter D of the conical introducing portion 4 can be decreased.

A multiple-fiber optical fiber ribbon 31 is taken for instance, in which eight single mode optical fibers each having an outer diameter of 250μ are juxtaposed with the respective intervals of 0.25 mm, and the optical fiber from the terminal end thereof is exposed by 5 mm. With respect to the multiple-fiber optical fiber ribbon 31, Sin θ was obtained through experimentation. As a result, the sin θ was 0.04.

Therefore, in a ferrule 1 into which the multiple-fiber optical fiber ribbon 31 is inserted and fixed, the inlet end diameter D of the conical introducing portion 4 was determined to be D=1×sin θ=5×0.04=0.20 mm. Where the multiple-fiber optical fiber ribbon 31 is inserted into the optical connector thus designed, the ribbon 31 could be inserted without damaging the optical fibers 32, and the assembling could be easily carried out.

In the above preferred embodiment, the inlet end diameter D of the conical introducing portion 4 was determined on the basis of the above examination to determine the construction of the ferrule 1.

The preferred embodiment is thus constructed. Next, a description is given of a method for assembling a multiple-fiber optical connector in compliance with the preferred embodiment. First, a ferrule 1 is formed as described above. Also, the sheathing of the optical fiber is removed to a position spaced an appointed distance from the terminal end of a multiple-fiber optical fiber ribbon 31 to be mounted. And, the respective optical fibers 32 are exposed by removing the sheathing thereof, and a boot is applied onto the multiple-fiber optical fiber ribbon 31 whose terminal end is thus treated. Subsequently, the terminal end portion of the corresponding multiple-fiber optical fiber ribbon 31 is inserted into the ribbon inserting hole 2 via a boot insertion hole 12 of the ferrule 1.

The optical fibers 32 led out from the multiple-fiber optical fiber ribbon 31 are led from the ribbon insertion hole 2 to the tapered portion 3 and from the conical introducing portion 4 to introduce the respective optical fibers to the optical fiber introducing hole 5. The optical fiber 32 that enters the optical fiber introducing hole 5 is guided from the conical inlet portion 6 of the minute hole 7 for inserting an optical fiber to the minute hole 7 for inserting the optical fiber.

Subsequently, the tip end portion 33 of the sheathed portion of the multiple-fiber optical fiber ribbon 31 is brought into contact with the intermediate position 8 of the tapered portion 3 and cannot go any further. Therefore, the inserting position of the multiple-fiber optical fiber ribbon 31 is determined at this position (the position where the tip end portion 33 of the sheathed portion is brought into contact with the tapered portion at the intermediate position 8).

Further, a multiple-fiber optical fiber ribbon 31 inserted into and fixed in the ferrule 1 is unsheathed at the position, where the tip end portion 33 of the sheathed portion is stopped at the tapered portion 3, so that the tip end of the optical fiber 32 protrude from the end face of the minute hole 7 for inserting an optical fiber. That is, it is necessary that the length 1 of an optical fiber 32 exposed is determined to be a length by which the tip end of the optical fiber 32 can pass through the ferrule when the multiple-fiber optical fiber ribbon 31 is mounted in the ferrule 1.

Also, in the preferred embodiment, since any adhesive agent inserting window 11, which is provided in the prior art, is no longer required in multiple-fiber optical connectors, the adhesive agent is inserted into the ferrule 1 as described below. That is, in the process 1 in FIG. 5, the side of the minute hole 7 for inserting an optical fiber is set to an absorber. Next, in the process 2, the absorber is driven while inserting an adhesive agent from the inlet side of the ribbon inserting hole 2 via the boot inserting hole 12, whereby the adhesive agent is absorbed into the minute hole 7 for inserting an optical fiber in order to fill it up in the ferrule.

After the adhesive agent is thus inserted, in the process 3, an optical fiber 32 is unsheathed by an appointed length, and a multiple-fiber optical fiber ribbon 31 covered with a boot 34 is inserted into the ribbon inserting hole 2. Thereafter, in the process 4, the respective unsheathed optical fibers 32 are inserted into appointed minute holes 7 for inserting optical fibers, wherein by hardening the adhesive agent, the terminal end portion of the multiple-fiber optical fiber ribbon 31 including the unsheathed optical fibers 32 are fixed in the ferrule 1 to create a multiple-fiber optical connector.

By the abovementioned assembling processes, in a multiple-fiber optical connector according to the preferred embodiment in which a ferrule having no adhesive agent inserting window 11 is used, an assembling series of an optical connector such as insertion of an adhesive agent, insertion of an optical fiber ribbon, and hardening of the adhesive agent, etc., can be automated.

Furthermore, where the terminal end portion of the multiple-fiber optical fiber ribbon 31 is fixed, it is sufficient that the terminal end portion thereof is adhered to the ferrule to such a degree that they are not peeled off from each other. However, it is necessary to firmly adhere at least the optical fiber 32 in the minute hole 7 for inserting an optical fiber since the tip end of the optical fiber 32 is polished to be flush with the end face of the ferrule 1 after the unsheathed optical fiber 32 is mounted in producing a multiple-fiber optical connector.

A multiple-fiber optical connector according to the preferred embodiment is thus produced, and the tip end portion 33 of the sheathed portion at the terminal end portion of the multiple-fiber optical fiber ribbon 31 is stopped at the intermediate position 8 of the tapered portion 3 as described above, and the stopping position is then determined.

Therefore, in the preferred embodiment, as in the prior art multiple-fiber connectors, the tip end 33 of the sheathed portion of the multiple-fiber optical fiber ribbon 31 will never mount the stepped portion formed in the ferrule 1. Accordingly, in the preferred embodiment, it is possible to completely prevent working mistakes such as positional slips of the abovementioned sheathed portion which will cause a transmission loss and a problem of interruption.

In addition, a multiple-fiber optical connector according to the preferred embodiment is provided with a conical introducing portion 4 formed at the outlet of the tapered portion 3, whereby it is possible to very easily insert the unsheathed optical fibers 32 into minute holes 7 for inserting optical fibers.

Also, since a multiple-fiber optical connector according to the preferred embodiment is provided with a conical inlet portion 6 at the inlet side of the minute hole 7 for inserting an optical fiber, it is possible to very easily insert the unsheathed optical fibers 32 into minute holes 7 for inserting optical fibers.

As described above, according to the preferred embodiment, the terminal end portion of a multiple-fiber optical fiber ribbon 31 can be securely stopped in safety, and the unsheathed portion of the optical fibers can be inserted without creating any damages such as buckling, bending, etc., to the unsheathed optical fibers 32 of a multiple-fiber optical fiber ribbon 31. Accordingly, automation of inserting a multiple-fiber optical fiber ribbon 31 into a ferrule 1 is enabled.

FIG. 3 shows a second preferred embodiment of a multiple-fiber optical connector according to the invention. In the same drawing, (a) is a longitudinally sectional view of the multiple-fiber optical connector, and (b) is a cross-sectional view of the multiple-fiber optical connector. In a description of the second preferred embodiment, parts which are identical to those of the first preferred embodiment are given the same reference numbers, and an overlapping description thereof is omitted.

A multiple-fiber optical connector according to the preferred embodiment is constructed almost identical to the multiple-fiber optical connector of the first preferred embodiment. A significant characteristic point of the second embodiment is in that minute holes 7 for inserting optical fibers are formed adjacent to the conical introducing portion 4, omitting the optical fiber inserting portion 5 and conical inlet portion 6.

The second preferred embodiment is thus constructed as in the abovementioned first preferred embodiment, and brings about the same effects. Further, since a multiple-fiber optical fiber according to the preferred embodiment is simpler in structure than the abovementioned first preferred embodiment, it is possible to further easily produce multiple-fiber optical connectors.

FIG. 4 shows a third preferred embodiment of a multiple-fiber optical connector according to the third preferred embodiment. In the same drawing, (a) is a longitudinally sectional view of a multiple-fiber optical connector, and (b) is a cross-sectional view of the multiple-fiber optical connector. In a description of the third preferred embodiment, parts which are identical to those of the first preferred embodiment are given the same reference numbers, and an overlapping description thereof is omitted.

A multiple-fiber optical connector according to the third preferred embodiment is not provided with the tapered portion 3 which is provided in the first and second preferred embodiments, and whose tip end portion width is narrower than the width of a multiple-fiber optical fiber ribbon. Instead, the third preferred embodiment is provided with a first tapered portion 3a, a tip end side insertion portion 10 of the sheathed portion, and a second tapered portion 3b.

The first tapered portion 3a has a reduced width at the tip end side and the width of the tip end portion thereof is roughly coincident with the width of the abovementioned multiple-fiber optical fiber ribbon 31. The tip end side insertion portion 10 of the sheathed portion is provided so as to communicate with the first tapered portion 3a. The tip end side insertion portion 10 of the sheathed portion is a hole having a fixed diameter, whose width is roughly coincident with the width of the multiple-fiber optical fiber ribbon and whose height is roughly coincident with the height of the multiple-fiber optical fiber ribbon 31. The second tapered portion 3b is formed at the tip end of the tip end side insertion portion 10 of the sheathed portion via a stepped portion and has a reduced diameter at the tip end side. The inlet hole diameter of the second tapered portion 3b is formed smaller than the width of the multiple-fiber optical fiber ribbon 31.

The third preferred embodiment is featured in that the tip end stepped portion of the tip end side insertion hole 10 of the sheathed portion stops the tip end portion 33 of the sheathed portion of the terminal end portion of the multiple-fiber optical fiber ribbon 31, and is made into a sheathed portion tip end stopping portion which determines the tip end position.

The construction of the third preferred embodiment other than the above is the same as in the abovementioned second preferred embodiment.

The third preferred embodiment is thus constructed almost as in the first and second preferred embodiments, and brings about the same effects.

Further, the third preferred embodiment is featured in that it is provided with a first tapered portion 3a, a tip end side insertion portion 10 of the sheathed portion, and a second tapered portion 3b instead of the tapered portion 3 in the first and second preferred embodiments, and the stepped portion at the tip end of the tip end side insertion portion 10 of the sheathed portion is made into the stopping portion of the sheathed tip end. And, the tip end side insertion portion 10 of the sheathed portion is a hole having a fixed diameter. Therefore, the multiple-fiber optical fiber ribbon 31 inserted into the ferrule 1 can be positioned at an appointed position including positioning in the inserting direction without slipping from the center axis in the vertical and horizontal directions.

Also, in the third preferred embodiment, the length $l_2$ of the tip end side insertion portion 10 of the sheathed portion can be determined based on a relationship with the length 1, of the minute hole 7 for inserting an optical fiber. That is, the length $l_2$ is made slightly larger than the length $l_1$. If so, the tip end portion 33 of the sheathed portion of the multiple-fiber optical fiber ribbon 31 is inserted into the tip end side insertion portion 10 of the sheathed portion, wherein the inserting position is determined in the vertical and horizontal directions of the optical fiber ribbon 31, and the respective unsheathed optical fibers 32 can reach the conical introducing portion 4. Therefore, if the length $l_2$ is made slightly larger than the length $l_1$, it is possible to further reduce the positional slip of the tip end position of the respective optical fibers 32. And, insertion of the respective optical fibers 32 into the minute holes 7 can be securely carried out even easier in safety.

Further, the invention is not limited to the respective embodiments described above, but it may be subjected to various modifications. For example, although the tapered portion 3, the first tapered portion 3a and the second tapered portion 3b may be provided at four sides in the vertical and horizontal directions of the ribbon insertion hole 2 as in the respective embodiments, it is acceptable that they are provided in only two vertical sides or two horizontal sides.

Industrial Applicability

As described above, the invention has high efficiency in assembling, wherein the ratio of defectives can be minimized. Therefore, with the invention, automated assembling of multiple-fiber optical connectors having a wide width is enabled, without interruption of optical fibers, with high reliability and in safety. Accordingly, the invention is suitable for collective connections of a plurality of optical fibers of a multiple-fiber optical fiber ribbon to the mating optical fibers at a minimized connection loss.

What is claimed is:

1. A multiple-fiber connector having a multiple-fiber optical fiber ribbon having a plurality of optical fibers juxtaposed and collectively sheathed by a sheathing portion, the sheathed portion removed at a tip end side of said multiple-fiber optical fiber ribbon exposing the optical fibers, a terminal portion of said multiple-fiber optical fiber ribbon including said exposed optical fibers are inserted and fixed in a ferrule;

wherein the ferrule is provided with a ribbon insertion hole having a greater width than the width of said multiple-fiber optical fiber ribbon, a tapered portion communicating with said multiple-fiber optical ribbon, whose width is decreased toward the tip end side thereof, and minute holes for inserting optical fibers which communicate with said tapered portion and are juxtaposed in a plurality so that said respective exposed optical fibers are individually inserted thereinto, from one side to an other end side in said ferrule; the width at the tip end portion of said tapered portion is formed to be narrower than that of said multiple-fiber optical fiber ribbon; and a position of the halfway of said tapered portion, which width substantially coincide with the width of the multiple-fiber optical fiber ribbon stops the tip end portion of the sheathed portion at the terminal portion of a multiple-fiber optical fiber ribbon inserted from said ribbon insertion hole, and is made into a stopping portion of the sheathed portion tip end which determines the tip end position.

2. A multiple-fiber optical connector as set forth in claim 1, wherein an optical fiber introducing hole whose diameter is greater than that of minute holes for inserting optical fibers is formed at the forward side at the tip end side of the tapered portion, a conical inlet portion whose diameter is reduced is formed at the tip end side of said optical fiber introducing hole, and minute holes for inserting said optical fibers are formed so as to communicate with said conical inlet portion.

3. A multiple-fiber connector having a multiple-fiber optical fiber ribbon having a plurality of optical fibers juxtaposed and collectively sheathed by a sheathing portion, the sheathed portion removed at a tip end side of said multiple-fiber optical fiber ribbon exposing the optical fibers, a terminal portion of said multiple-fiber optical fiber ribbon including said exposed optical fibers are inserted and fixed in a ferule;

wherein the ferrule is provided with a ribbon insertion hole having a greater width than the width of said multiple-fiber optical fiber ribbon, a first tapered portion whose tip end width is substantially coincident with that of said multiple-fiber optical fiber ribbon, a tip end side insertion portion of a sheathed portion, which communicates with said first tapered portion, having a substantially fixed width, and whose hole width is substantially coincident with said multiple-fiber optical fiber ribbon, and a second tapered portion having a width-reduced tip end portion formed, via a stepped portion, at the tip end of the tip end side insertion portion of said sheathed portion, and minute holes for inserting optical fibers which communicate with said second tapered portion and are juxtapose in a plurality so that said respective exposed optical fibers are individually inserted thereinto, from one side to an other end side in said ferrule; the inlet width of said second tapered portion is formed smaller than the width of said multiple-fiber optical fiber ribbon; the stepped portion of the tip end of the tip end side insertion portion of said sheathed portion stops the tip end portion of the sheathed portion at the terminal end portion of said multiple-fiber optical fiber ribbon, and is made into the sheathed tip end stopping portion which determines the position of the tip end portion.

4. A multiple-fiber optical connector as set forth in claim 1, wherein a conical introduction portion having a diameter-reduced portion at the tip end thereof is formed at the outlet of the tapered portion.

5. A multiple-fiber optical connector as set forth in claim 3, wherein a conical introduction portion having a diameter-reduced portion at the tip end thereof is formed at the outlet of the second tapered portion.

6. A multiple-fiber optical connector as set forth in claim 4, wherein the respective input end diameters of said conical introduction portion are formed so as to become $L > D \geq 1 \times \sin\theta$, where the optical fiber array pitch of a multiple-fiber optical fiber ribbon is L, the length of exposed optical fibers at the tip end of said multiple-fiber optical fiber ribbon is 1, the deflection angle of said exposed optical fibers is $\theta$, and the respective inlet diameters of the conical introduction portion are D.

7. A multiple-fiber optical connector as set forth in claim 5, wherein said conical introduction portion comprises respective input end diameters defined in accordance with a plurality of parameters wherein an optical fiber array pitch of the multiple-fiber optical fiber ribbon is L, a length of exposed optical fibers at the tip end of said multiple-fiber optical fiber ribbon is 1, a deflection angle of said exposed optical fibers is $\theta$ and respective inlet diameters of the conical introduction portion are D, such that $L > D \geq 1 \times \sin\theta$.

8. A multiple-fiber optical connector as set forth in claim 1 wherein no insertion window for an adhesive agent is provided.

9. A multiple-fiber optical connector as set forth in claim 3, wherein no insertion window for an adhesive is provided.

10. A multiple-fiber optical connector as set forth in claim 4, wherein no insertion window for an adhesive agent is provided.

11. A multiple-fiber optical connector as set forth in claim 5, wherein no insertion window for an adhesive is provided.

12. A multiple-fiber optical connector as set forth in claim 7, wherein said multiple-fiber optical fiber ribbon is absent an insertion window for an adhesive agent.

13. A method for assembling a multiple-fiber optical connector described in claim 8, wherein the terminal end portion of the multiple-fiber optical fiber ribbon including exposed optical fibers is fixed in a ferrule by hardening an adhesive agent after inserting said adhesive agent into the inlet side of a ribbon insertion hole of said ferrule, absorbing said adhesive agent through the outlet side at the tip end of the minute holes for inserting optical fibers, and inserting said exposed optical fibers into said minute holes for inserting optical fibers with the sheathing at the tip end of the multiple-fiber optical fiber ribbon removed.

* * * * *